United States Patent
Iwamoto

(10) Patent No.: US 9,200,939 B2
(45) Date of Patent: Dec. 1, 2015

(54) FLOW RATE MEASUREMENT APPARATUS AND FLUID SUPPLY SYSTEM

(75) Inventor: Ryuji Iwamoto, Kadoma (JP)

(73) Assignee: Panasonic Corporation (JP)

( * ) Notice: Subject to any disclaimer, the term of this patent is extended or adjusted under 35 U.S.C. 154(b) by 859 days.

(21) Appl. No.: 12/664,265

(22) PCT Filed: Jun. 12, 2008

(86) PCT No.: PCT/JP2008/001507
§ 371 (c)(1),
(2), (4) Date: Jun. 22, 2010

(87) PCT Pub. No.: WO2008/152812
PCT Pub. Date: Dec. 18, 2008

(65) Prior Publication Data
US 2011/0178732 A1    Jul. 21, 2011

(30) Foreign Application Priority Data

Jun. 12, 2007  (JP) ................. 2007-154763
Jun. 29, 2007  (JP) ................. 2007-172545
Jun. 29, 2007  (JP) ................. 2007-172546

(51) Int. Cl.
G01F 15/00    (2006.01)
G01F 15/06    (2006.01)
G01F 15/075   (2006.01)

(52) U.S. Cl.
CPC ............ *G01F 15/005* (2013.01); *G01F 15/063* (2013.01); *G01F 15/0755* (2013.01)

(58) Field of Classification Search
CPC ..... G06F 8/447; G01F 15/005; G01F 15/063; G01F 15/0775; G06Q 50/06; H02J 2003/143
USPC ........................................................... 702/45
See application file for complete search history.

(56) References Cited

U.S. PATENT DOCUMENTS 4,866,633 A * 9/1989 Nakane et al. ................. 700/282
5,216,623 A * 6/1993 Barrett et al. .................... 702/62
(Continued)

FOREIGN PATENT DOCUMENTS

EP    2163865 A1    3/2010
JP    2003-149027 A *  5/2003  ............... G01F 3/22
(Continued)

OTHER PUBLICATIONS

Kotakane et al., JP 2005321197 (translation), Nov. 2005.*
(Continued)

*Primary Examiner* — John Breene
*Assistant Examiner* — Jeffrey Aiello
(74) *Attorney, Agent, or Firm* — Brinks Gilson & Lione

(57) ABSTRACT

On occasion of provision of a technique for identifying an appliance, an attempt can be made to enhance computing speed and the accuracy of identification of an appliance while the amount of memory required for an apparatus is reduced. In a gas meter 100, an ultrasonic flowmeter 104 measures the quantity of a gas flowing through a flow path 102 at a given time interval, and a computation section 108 computes a difference value of the measured flow at each given time. A difference value conversion section 112 converts a computed difference value into a code with reference to a flow rate class table 110*a* by which a plurality of difference value classes corresponding to a size of the difference value and codes representing the respective classes are associated with each other. A code sequence generation section 114 further generates a measurement code sequence from an aggregation of codes at each given time, and an appliance identification section 116 compares the measurement code sequence with an appliance characteristic code sequence showing a characteristic code sequence of each gas appliance, thereby identifying a gas appliance that uses a gas.

37 Claims, 15 Drawing Sheets

(56) References Cited

U.S. PATENT DOCUMENTS

| | | | | |
|---|---|---|---|---|
| 5,369,598 | A * | 11/1994 | Horiike et al. | 702/46 |
| 5,675,504 | A * | 10/1997 | Serodes et al. | 702/25 |
| 6,625,549 | B1 * | 9/2003 | Nawa et al. | 702/51 |
| 2002/0123852 | A1 * | 9/2002 | Gysling et al. | 702/100 |
| 2004/0015302 | A1 * | 1/2004 | Suzuki et al. | 702/38 |
| 2006/0150113 | A1 * | 7/2006 | Natsume et al. | 715/763 |
| 2007/0192046 | A1 * | 8/2007 | Hairston | 702/45 |
| 2008/0270045 | A1 * | 10/2008 | Miyata et al. | 702/45 |
| 2009/0024327 | A1 * | 1/2009 | Berard et al. | 702/12 |
| 2009/0240444 | A1 * | 9/2009 | Miyata et al. | 702/45 |
| 2009/0240445 | A1 * | 9/2009 | Umekage et al. | 702/48 |
| 2009/0248213 | A1 * | 10/2009 | Gotoh | 700/282 |
| 2009/0271128 | A1 * | 10/2009 | Umekage et al. | 702/45 |
| 2010/0188261 | A1 * | 7/2010 | Fujii et al. | 340/870.02 |
| 2010/0292940 | A1 * | 11/2010 | Iwamoto | 702/45 |
| 2010/0326548 | A1 * | 12/2010 | Miyata et al. | 137/561 R |
| 2011/0178732 | A1 * | 7/2011 | Iwamoto | 702/45 |

FOREIGN PATENT DOCUMENTS

| | | | | |
|---|---|---|---|---|
| JP | 2003149027 | * | 5/2003 | G01F 3/22 |
| JP | 2003149027 A | * | 5/2003 | G01F 3/22 |
| JP | 2003-194331 A | | 7/2003 | |
| JP | 2005-321197 A | | 11/2005 | |
| JP | 2005321197 A | * | 11/2005 | G01F 3/22 |
| JP | 2006-038630 A | | 2/2006 | |
| JP | 2006038630 A | * | 2/2006 | G01F 3/22 |
| JP | 2006-313114 A | | 11/2006 | |
| JP | 2006313114 | * | 11/2006 | G01F 3/22 |
| JP | 2007-024807 A | | 2/2007 | |

OTHER PUBLICATIONS

International Search Report for International Application No. PCT/JP2008/001507, dated Jul. 29, 2008, 1 page.

Extended European Search Report for European Application No. 08764102.3, dated Jun. 27, 2012, 7 pages.

* cited by examiner

FIG. 2

| ABSOLUTE FLOW RATE Q(n) | DIFFERENCE FLOW RATE ΔQ | CODE N1 | |
|---|---|---|---|
| Q(n)≠0 | LARGER THAN 150L/h | 7 | INCREASE AREA |
| | 150L/h ≥ ΔQ > 100L/h | 6 | |
| | 100L/h ≥ ΔQ > 50L/h | 5 | |
| | 50L/h ≥ ΔQ > 10L/h | 4 | |
| | 10L/h ≥ ΔQ > 1L/h | 3 | STABLE AREA |
| | 1L/h ≥ ΔQ > 0.5L/h | 2 | |
| | 0.5L/h ≥ ΔQ > 0L/h | 1 | |
| | 0L/h | 8 | |
| | 0L/h > ΔQ ≥ −0.5L/h | 9 | |
| | −0.5L/h > ΔQ ≥ −1L/h | A | |
| | −1L/h > ΔQ ≥ −10L/h | B | |
| | −10L/h > ΔQ ≥ −50L/h | C | DECREASE AREA |
| | −50L/h > ΔQ ≥ −100L/h | D | |
| | −100L/h > ΔQ ≥ −150L/h | E | |
| | SMALLER THAN −150L/h | F | |
| Q(n)=0 | | 0 | AREA WHERE FLOW RATE ASSUMES VALUE OF ZERO |

| CODE N2 | |
|---|---|
| 1 | INCREASE AREA |
| 3 | STABLE AREA |
| 2 | DECREASE AREA |
| 0 | AREA WHERE FLOW RATE ASSUMES VALUE OF ZERO |

| FLOW RATE VALUE Q(n) | DIFFERENCE VALUE Δ2 SEC | 16 CLASSES CODE N1 | 4 CLASSES CODE N2 |
|---|---|---|---|
| 0 | 0 | 0 | 0 |
| 60 | 60 | 5 | 1 |
| 120 | 60 | 5 | 1 |
| 123 | 3 | 3 | 3 |
| 140 | 17 | 4 | 1 |
| 160 | 20 | 4 | 1 |
| 165 | 5 | 3 | 3 |
| 167 | 2 | 3 | 3 |
| 166 | −1 | A | 3 |
| 166 | 0 | 1 | 3 |

| FLOW RATE VALUE Q(n) | DIFFERENCE VALUE Δ2 SEC | 16 CLASSES CODE N1 | 4 CLASSES CODE N2 |
|---|---|---|---|
| 0 | 0 | 0 | 0 |
| 230 | 230 | 7 | 1 |
| 450 | 220 | 7 | 1 |
| 600 | 150 | 7 | 1 |
| 640 | 40 | 4 | 1 |
| 630 | -10 | B | 3 |
| 620 | -10 | B | 3 |
| 625 | 5 | 3 | 3 |
| 624 | -1 | A | 3 |
| 622 | -2 | B | 3 |

| FLOW RATE VALUE Q(n) | DIFFERENCE VALUE Δ2 SEC | 16 CLASSES CODE N1 | 4 CLASSES CODE N2 |
|---|---|---|---|
| 105.1 | −0.1 | 9 | 3 |
| 105.0 | −0.1 | 9 | 3 |
| 104.7 | −0.3 | 9 | 3 |
| 104.8 | 0.1 | 1 | 3 |
| 104.9 | 0.1 | 1 | 3 |
| 105.0 | 0.1 | 1 | 3 |
| 104.9 | −0.1 | 9 | 3 |
| 104.8 | −0.1 | 9 | 3 |
| 104.8 | −0.1 | 9 | 3 |
| 104.9 | 0.2 | 1 | 3 |
| 128.4 | 23.5 | 4 | 1 |
| 151.2 | 22.8 | 4 | 1 |
| 150.7 | −0.5 | 9 | 3 |
| 150.3 | −0.4 | 9 | 3 |
| 150.5 | 0.2 | 1 | 3 |
| 151.1 | 0.7 | 2 | 3 |

| FLOW RATE VALUE Q(n) | DIFFERENCE VALUE Δ2 SEC | 16 CLASSES CODE N1 | 4 CLASSES CODE N2 |
|---|---|---|---|
| 0 | 0 | 0 | 0 |
| 44 | 44 | 5 | 1 |
| 136 | 92 | 6 | 1 |
| 185 | 49 | 5 | 1 |
| 187 | 2 | 3 | 3 |
| 186 | −1 | A | 3 |
| 186 | −1 | A | 3 |
| 186 | 1 | 2 | 3 |
| 188 | 2 | 3 | 3 |
| 201 | 14 | 4 | 1 |
| 228 | 27 | 5 | 1 |
| 243 | 15 | 4 | 1 |
| 243 | 1 | 2 | 3 |
| 243 | 0 | 1 | 3 |
| 244 | 0 | 1 | 3 |
| 244 | 0 | 9 | 3 |

| FLOW RATE VALUE Q(n) | DIFFERENCE VALUE Δ2 SEC | 16 CLASSES CODE N1 | 4 CLASSES CODE N2 |
|---|---|---|---|
| 0 | 0 | 0 | 0 |
| 35.9 | 35.9 | 5 | 1 |
| 70.7 | 34.8 | 5 | 1 |
| 66.4 | -4.3 | B | 3 |
| 63.7 | -2.7 | B | 3 |
| 64.2 | 0.5 | 1 | 3 |
| 64.7 | 0.5 | 2 | 3 |
| 64.5 | -0.2 | 9 | 3 |
| 64.0 | -0.6 | A | 3 |
| 63.9 | -0.1 | 9 | 3 |
| 63.7 | -0.3 | 9 | 3 |
| 38.6 | -25.0 | D | 2 |
| 11.2 | -27.4 | D | 2 |
| 0.0 | -11.2 | C | 2 |
| 0 | 0 | 0 | 0 |
| 0 | 0 | 0 | 0 |

| FLOW RATE VALUE Q(n) | DIFFERENCE VALUE Δ2 SEC | 16 CLASSES CODE N1 | 4 CLASSES CODE N2 |
|---|---|---|---|
| 0 | 0 | 0 | 0 |
| 45.2 | 45.2 | 5 | 1 |
| 87.9 | 42.8 | 5 | 1 |
| 87.6 | −0.3 | 9 | 3 |
| 89.2 | 1.5 | 3 | 3 |
| 88.9 | −0.3 | 9 | 3 |
| 88.9 | 0.1 | 1 | 3 |
| 89.0 | 0.0 | 1 | 3 |
| 89.5 | 0.5 | 1 | 3 |
| 89.3 | −0.2 | 9 | 3 |
| 88.8 | −0.5 | 9 | 3 |
| 88.8 | 0.0 | 1 | 3 |
| 88.9 | 0.1 | 9 | 3 |
| 45.0 | −43.9 | D | 2 |
| 0.0 | −45.0 | D | 2 |
| 0 | 0.0 | 0 | 0 |

FIG. 7C

| FLOW RATE VALUE Q(n) | DIFFERENCE VALUE Δ2 SEC | 16 CLASSES CODE N1 | 4 CLASSES CODE N2 |
|---|---|---|---|
| 145 | 0 | 8 | 3 |
| 145 | 0 | 8 | 3 |
| 145 | 0 | 8 | 3 |
| 145 | 0 | 8 | 3 |
| 145 | 0 | 8 | 3 |
| 145 | 0 | 8 | 3 |
| 145 | 0 | 8 | 3 |
| 97 | −48 | C | 2 |
| 2 | −94 | D | 2 |
| 0 | −2 | B | 3 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 113 | 113 | 6 | 1 |
| 229 | 117 | 6 | 1 |
| 236 | 7 | 3 | 3 |
| 238 | 2 | 3 | 3 |
| 237 | −1 | B | 3 |
| 238 | 2 | 3 | 3 |
| 240 | 1 | 3 | 3 |
| 239 | −1 | A | 3 |
| 239 | 0 | 9 | 3 |
| 239 | 1 | 2 | 3 |
| 240 | 1 | 3 | 3 |
| 240 | 0 | 9 | 3 |
| 240 | −1 | 9 | 3 |
| 239 | −1 | A | 3 |
| 238 | −1 | A | 3 |
| 239 | 0 | 9 | 3 |
| 238 | 0 | 9 | 3 |

| FLOW RATE VALUE | DIFFERENCE VALUE | 16 CLASSES | 4 CLASSES |
|---|---|---|---|
| Q (n) | Δ2 SEC | CODE N1 | CODE N2 |
| 145 | -93 | D | 2 |
| 145 | 0 | 8 | 3 |
| 145 | 0 | 8 | 3 |
| 145 | 0 | 8 | 3 |
| 145 | 0 | 8 | 3 |
| 145 | 0 | 8 | 3 |
| 80 | -65 | D | 2 |
| 0 | -80 | D | 2 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 119 | 119 | 6 | 1 |
| 237 | 118 | 6 | 1 |
| 238 | 1 | 2 | 3 |
| 240 | 2 | 3 | 3 |
| 239 | -1 | A | 3 |

FIG. 8

| ABSOLUTE FLOW RATE Q(n) | DIFFERENCE FLOW RATE ΔQ | CODE N1 | |
|---|---|---|---|
| Q(n)≠0 | LARGER THAN 30L/h | 7 | INCREASE AREA |
| | 30L/h ≧ ΔQ > 20L/h | 6 | |
| | 20L/h ≧ ΔQ > 15L/h | 5 | |
| | 15L/h ≧ ΔQ > 10L/h | 4 | |
| | 10L/h ≧ ΔQ > 1L/h | 3 | STABLE AREA |
| | 1L/h ≧ ΔQ > 0.5L/h | 2 | |
| | 0.5L/h ≧ ΔQ > 0L/h | 1 | |
| | 0L/h | 8 | |
| | 0L/h > ΔQ ≧ −0.5L/h | 9 | |
| | −0.5L/h > ΔQ ≧ −1L/h | A | |
| | −1L/h > ΔQ ≧ −10L/h | B | |
| | −10L/h > ΔQ ≧ −15L/h | C | DECREASE AREA |
| | −15L/h > ΔQ ≧ −20L/h | D | |
| | −20L/h > ΔQ ≧ −30L/h | E | |
| | SMALLER THAN −30L/h | F | |
| Q(n)=0 | | 0 | AREA WHERE FLOW RATE ASSUMES VALUE OF ZERO |

| CODE N2 | |
|---|---|
| 1 | INCREASE AREA |
| 3 | STABLE AREA |
| 2 | DECREASE AREA |
| 0 | AREA WHERE FLOW RATE ASSUMES VALUE OF ZERO |

.# FLOW RATE MEASUREMENT APPARATUS AND FLUID SUPPLY SYSTEM

This application is a 371 application of PCT/JP2008/001507 having the international filing date of Jun. 12, 2008, which claims priority to JP 2007-154763 filed Jun. 12, 2007, JP 2007-172545 filed Jun. 29, 2007 and JP 2007-172546 filed Jun. 29, 2007, the entire contents of which are incorporated herein by reference.

BACKGROUND OF THE INVENTION

1. Technical Field

The present invention relates to a technique for correctly identifying an apparatus using a fluid, by capturing changes in a flow rate of a fluid.

2. Description of the Related Art

A gas meter described in connection with Patent Document 1 has hitherto been available as a gas meter that identifies a working appliance in a fluid pipe system having a gas meter. As shown in FIG. 11, a gas meter 1 described in connection with the document is made up of a flow rate measurement unit 3 that is disposed in a flow path 6 connected to a household gas supply pipe and that measures a gas flow rate at a given time interval; a computation unit 4 that determines a difference value of flow rate values output from the flow rate measurement unit 3; and a comparison determination unit 7 that compares the difference value computed by the computation unit 4 with a change determination value registered in a storage unit 5, to thus determine a change in a working state of the gas appliance. The computation unit 4, the comparison determination unit 7, and a gas shutoff valve 2 are controlled by a control circuit 8.

In the gas meter 1, a change in a difference value of an instantaneous flow rate output from the flow rate measurement unit 3 is consecutively computed, and a change in working state of the gas appliance is determined by the amount of change. Registered data are compared with the measured change in gas flow rate (the difference value), thereby enabling identification of working gas appliances 13, 14, and 15.

Patent Document 1: JP-A-2006-313114

PROBLEM THAT THE INVENTION IS TO SOLVE

In the configuration described above, since the difference values are directly used for the identification, basically the identification can be performed only in a limited time period and thus it is hard to say that the appliance identification accuracy is sufficient; on the other hand, if the identification is attempted based on the whole of the flow rate values measured over the long term, it takes time in identifying the gas appliance and the necessary memory amount, etc., becomes enormous.

The present invention has been conceived to solve the problem and aims at enhancing computing speed and the accuracy of identification of an appliance while the amount of memory required for computation is reduced by simplifying computation.

SUMMARY OF THE INVENTION

Means for Solving the Problem

A flow rate measurement apparatus of the present invention has a flow rate measurement section that measures a flow rate of a fluid flowing through a flow path at a given time interval; a computation section that computes a difference value of the flow rate measured by the flow rate measurement section at the predetermined time period; a flow rate class table by which a plurality of difference value classes corresponding to a size of the difference value and codes representing the respective classes are associated with each other; a difference value conversion section that converts the difference value computed by the computation section into the code with reference to the flow rate class table; a code sequence generation section that generates a measurement code sequence based on an aggregation of the codes at the predetermined time period acquired by the difference value conversion section; and an appliance identification section that compares the measurement code sequence with an appliance characteristic code sequence showing a characteristic code sequence of each appliance, thereby identifying an appliance which uses the fluid.

According to the present invention, a code value obtained by encoding (converting) a difference value of a flow rate is used at the time of identification of an appliance that uses a fluid. Accordingly, computing operation which will be performed for identifying an appliance is simplified, and computing speed and the accuracy of identification of an appliance can be enhanced while the quantity of memory required for computation is reduced.

A flow rate measurement apparatus of the present invention has a flow rate measurement section that measures a flow rate of a fluid flowing through a flow path at a given time interval; a computation section that computes a difference value of the flow rate measured by the flow rate measurement section at the predetermined time period; a flow rate class table by which a plurality of difference value classes corresponding to a size of the difference values and codes representing the respective classes are associated with each other; a difference value conversion section that converts the difference value computed by the computation section into the code with reference to the flow rate class table; a code sequence generation section that generates a measurement code sequence based on an aggregation of the codes at the predetermined time period acquired by the difference value conversion section; and an appliance identification section that identifies an appliance, which uses the fluid, based on the measurement code sequence and a characteristic value pertaining to the measured flow rate.

According to the present invention, a code value obtained by encoding (converting) a difference value of flow rates is used at the time of identification of an appliance that uses a fluid. Further, an appliance can be identified with higher accuracy on the basis of a computed measurement code sequence and a characteristic value pertaining to a measured flow rate. Accordingly, computing operation which will be performed for identifying an appliance is simplified, and computing speed and the accuracy of identification of an appliance can be enhanced while the quantity of memory required for computation is reduced.

A flow rate measurement apparatus of the present invention has a flow rate measurement section that measures a flow rate of a fluid flowing through a flow path at a given time interval; a computation section that computes a difference value of the flow rate measured by the flow rate measurement section at the predetermined time period; a flow rate class table by which a plurality of difference value classes corresponding to a size of the difference value and codes representing the respective classes are associated with each other; a difference value conversion section that converts the difference value computed by the computation section into the code with reference to the flow rate class table; a code sequence generation section that generates a measurement code sequence based on an aggregation of the codes at the predetermined time period acquired by the difference value conversion section; and an appliance identification section that identifies an appliance, which uses the fluid, based on a pattern iteratively arising in the measurement code sequence.

According to the present invention, a code value obtained by encoding (converting) a difference value of flow rates is used at the time of identification of an appliance that uses a fluid. Further, an appliance can be identified with higher accuracy on the basis of a pattern that iteratively arises in a computed measurement code. Accordingly, computing operation which will be performed for identifying an appliance is simplified, and computing speed and the accuracy of identification of an appliance can be enhanced while the quantity of memory required for computation is reduced.

In the flow rate measurement apparatus of the present invention, the measurement code sequence or the measurement code sequence and the appliance characteristic code sequence show, during operation of an appliance; for instance, a flow rate rise characteristic of an appliance including a time of initiation of use of a fluid by the appliance, a flow rate fall characteristic of an appliance including a time of end of use of a fluid by the appliance, or a flow rate control characteristic achieved when the fluid is stably used. An appliance can be accurately identified by taking a characteristic property of each appliance as a code sequence.

The measurement code sequence or the measurement code sequence and the appliance characteristic code sequence preferably have a duration from when an appliance starts using a fluid until when a specific code sequence pattern appears. An appliance can be accurately identified by such a configuration.

In the flow rate measurement apparatus of the present invention, the characteristic value includes a value showing an actual flow rate achieved when the measured flow rate is stable, a value showing an actual flow rate achieved when the measured flow rate is at its peak, a flow rate characteristic achieved in a specific state in response to operation control of an appliance, a control characteristic value showing, e.g., a rise characteristic and a fall characteristic, or a combination of at least two of them. It is possible to accurately identify an appliance by use of a characteristic value, which is unique to each appliance, and a measurement code sequence acquired from a measured flow rate.

In the flow rate measurement apparatus of the present invention, a pattern in the measurement code sequence is a pattern that periodically, iteratively appears. Further, the appliance identification section includes an identification section that identifies an appliance based on a pattern iteratively appearing in the measurement code sequence and an interval at which the pattern appears, or an identification section that identifies an appliance based on a pattern periodically, iteratively appearing in the measurement code sequence and a period of the pattern. Moreover, when the appliance iterates initiation of use of the fluid and end of use of the fluid, the period of the pattern includes a duration from initiation of use of a fluid to initiation of next use of the fluid, a duration from end of use of a fluid to end of next use of the fluid, a duration from initiation of use of a fluid to end of next use of the fluid, and a duration from end of use of a fluid to initiation of next use of the fluid. An appliance can be identified with higher accuracy by any of the patterns in the measurement code sequence.

Further, according to the present invention, there is provided a flow rate measurement method to be performed by the flow rate measurement apparatus and a program for a computer that controls the flow rate measurement apparatus. Moreover, there is provided a fluid supply system using the flow rate measurement apparatus, the flow rate measurement method, and the program.

Advantage of the Invention

According to the present invention, it becomes possible to enhance computing speed and the accuracy of identification of an appliance achieved during identification while the amount of required memory is reduced.

BRIEF DESCRIPTION OF THE DRAWINGS

FIG. 2 is a view showing an example flow rate class table.

FIG. 8 is a view showing another example flow rate class table.

DETAILED DESCRIPTION OF THE PREFERRED EMBODIMENTS

Embodiments of the present invention will be herein below described by reference to the drawings.

First Embodiment

Figure 1:
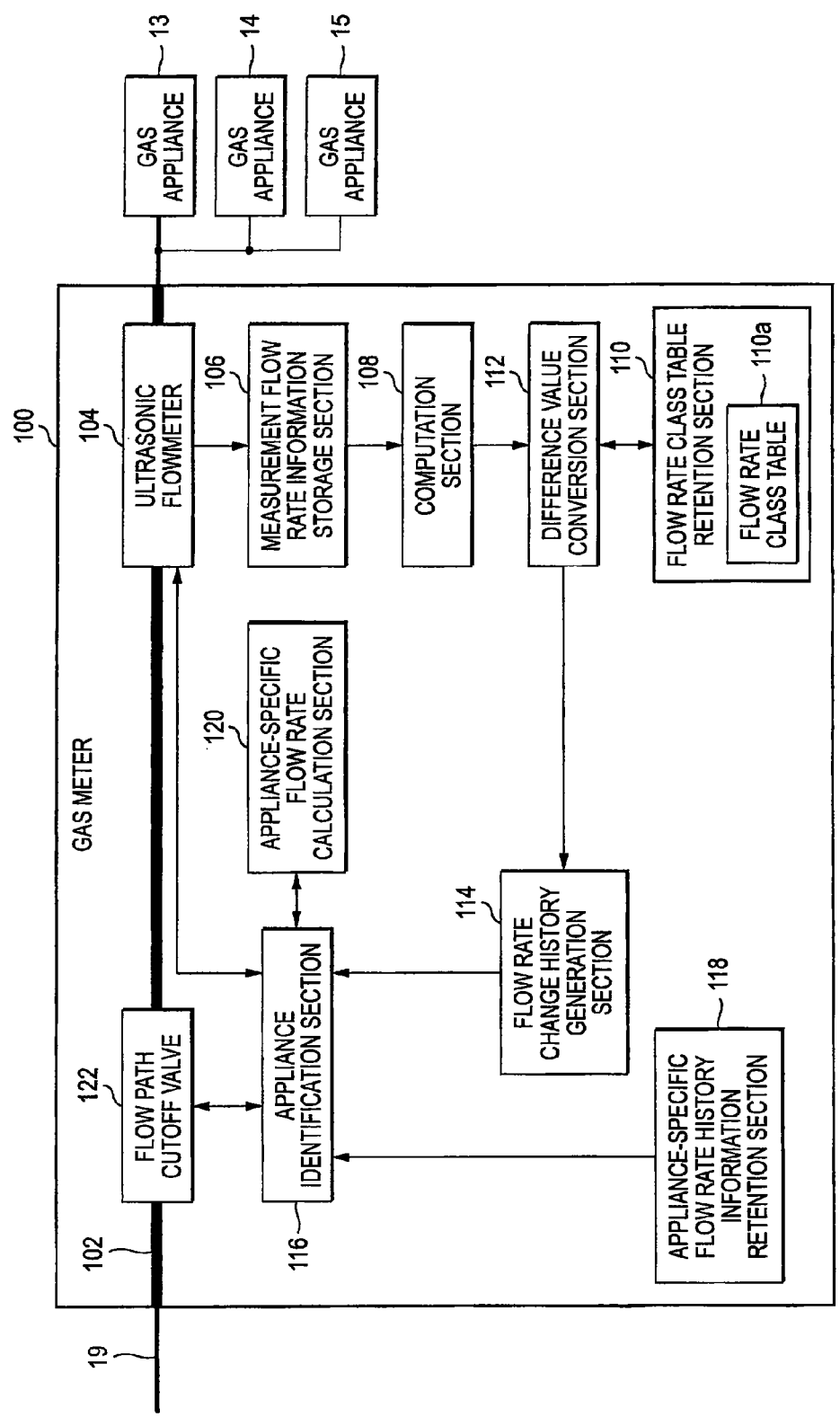
FIG. 1 is a block diagram of a gas meter of a first embodiment of the present invention.

FIG. 1 shows a block diagram of a gas meter serving as a flow rate measurement apparatus of a first embodiment of the present invention.

In FIG. 1, a gas meter 100 comprises a flow path 102; an ultrasonic flowmeter 104 serving as a flow rate measurement section; a measured flow rate information storage section 106; a computation section 108; a flow rate class table retention section 110; a difference value conversion section 112; a code sequence generation section 114; an appliance identification section 116; and an appliance characteristic code sequence information retention section 118. The gas meter 100 further includes a flow path cutoff valve 122 that is disposed in the flow path 102 and that shuts off gas in the event of an emergency and the like.

The ultrasonic flowmeter 104 emits an ultrasonic wave to a gas serving as a fluid which flows through the flow path 102, at a given time interval (e.g., two seconds, and the like), thereby measuring a flow rate of gas, and a common ultrasonic flowmeter can be used. The measured flow rate information storage section 106 stores target data described by associating the measurement flow rate value measured in the ultrasonic flowmeter 104 and the measurement time at which the measurement flow rate valued has been measured with each other.

Figures 3A, 3B:
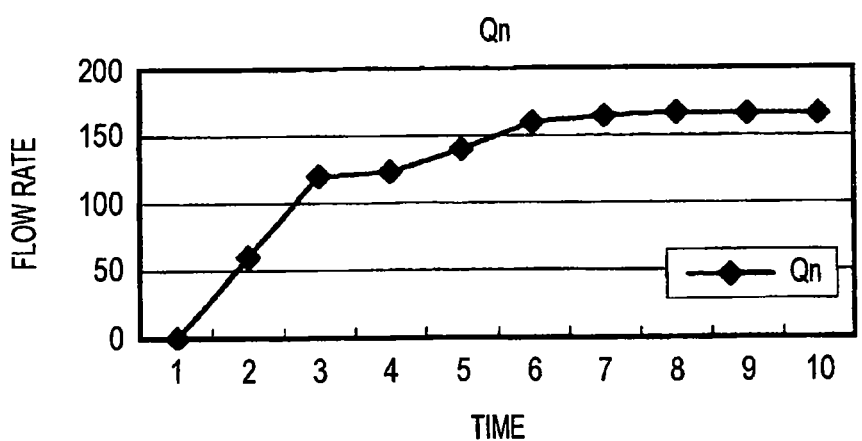
FIGS. 3 (A) and (B) are views showing a concept of classification of a difference value of flow rates resultant from use of a gas appliance A according to a flow rate class table.

The computation section 108 computes a difference value of the gas flow rates measured by the ultrasonic flowmeter 104, at a given period equivalent to an interval at which an ultrasonic wave is emitted. In FIG. 3 to be described later, when a flow rate acquired at predetermined timing (an actual flow rate) is 60 L/h (liter per hour) and when a flow rate acquired at the next timing is 120 L/h, a difference value achieved at this time is computed as 60 (L/h)=120−60. A difference value may also be computed from a flow rate achieved at timing after the next timing (i.e., the next flow rate achieved after a flow rate of 120 L/h).

The flow rate class table retention section 110 holds a flow rate class table 110a, such as that shown in FIG. 2, in which a plurality of difference value classes corresponding to difference values and codes representing the respective classes are associated with each other. The flow rate class table 110a acts as a conversion table that classifies measured difference values into predetermined classes, thereby converting the differentia values into predetermined codes representing the classes. Although no particular limitations are imposed on the number of classes of the flow rate class table 110a, two types of class tables; namely, 16 (code N1) and 4 (code N2), are prepared in FIG. 2. Specifically, the gas meter 100 can use a flow rate class table including 16 classes and another flow rate class table including four classes by switching between the two class tables, as required.

As shown in FIG. 2, two types of classes represented by the code N1 and the code N2 are prepared for the respective flow rate class tables. In the code N1, the flow rate class table is classified into four quadrants; namely, an area where a flow rate is determined to be zero; an area where a flow rate is determined to be stable (a stable area); an area where a flow rate is determined to be increasing (an increase area); and an area where a flow rate is determined to be decreasing (a decrease area). As shown in the table, these four areas are assigned to four numerals; namely, 0, 1, 2, 3, and each of the numerals can be represented by a 2-bit code. Specifically, numeral 0 can be represented as "00"; numeral 1 can be represented as "01"; numeral 2 can be represented as "10"; and numeral 3 can be represented as "11." As mentioned above, the classes are represented by use of a code rather than a related-art difference value, whereby better affinity with a microcomputer is assured and a determination indicator can be provided by a small memory size and a small amount of computation.

Although the area where a flow rate is determined to be zero is mentioned in connection with the embodiment, a flow rate which will be actually measured by an actual apparatus includes certain amounts of variations and hence rarely comes to complete zero. Therefore, a zero flow rate also implies a case where a flow rate has nearly or substantially come to zero.

The code N2 is generated by subdividing each of the areas; namely, subdividing the stable area into seven classes according to a degree of flow rate stability; subdividing the flow rate increase area into four classes according to the degree of increase; and subdividing the flow rate decrease area into four classes according to the degree of decrease. The area where a flow rate is determined to be zero is not subdivided. Therefore, the code N2 can be represented by a four-bit code (0 to 9 and A to F).

In the code N1, each of the areas is subdivided so as to have different flow rate widths. For instance, in the increase area, a class having a smaller difference flow rate is subdivided to a smaller flow rate width. For example, in an area of code "6," the width of a difference flow rate is 150−100=50 L/h. In an area of code "4," the width of the difference flow rate is 50−10=40 L/h. In an area of code "3," the width of the difference flow rate is 10−1=9 L/h. Such a configuration is provided in view of the necessity for narrowing the flow rate width in small flow rates in order to enhance the identification accuracy, since many types of appliances are operated within areas where the difference flow rate is small.

The difference value conversion section 112 converts a difference value computed by the computation section 108 into a code representing a class into which a difference value acquired at a given period (at which an ultrasonic wave is emitted) is classified, with reference to the flow rate class table 110a. The code sequence generation section 114 generates a measurement code sequence that is a sequence of a code acquired by actual measurement, from an aggregate of codes acquired at given intervals by the difference value conversion section 112. The measurement code sequence approximately represents a change in fluid flow rate. The code generation section 114 records the thus-generated measurement code sequence into unillustrated memory as required.

The appliance identification section 116 identifies a gas appliance that is using a gas serving as a fluid, from the measurement code sequence generated by the code sequence generation section 114. The appliance identification section 116 compares the measurement code sequence with an appliance characteristic code sequence representing a code sequence unique to a gas appliance previously stored for each gas appliance in the appliance characteristic code sequence information retention section 118, thereby identifying, from similarity between the code sequences, a gas appliance currently using a gas.

The appliance-specific flow rate calculation section 120 can also calculate a flow rate for each gas appliance identified by the appliance identification section 116. The gas meter 100 is connected to the gas pipe 19 at an upstream position and also connected, at downstream positions, to various gas appliances 13, 14, and 15, such as a gas cooker, a fan heater, a floor heating, and the like.

A method for recording a history of flow rate change by use of the gas meter 100 of the present embodiment will be hereinbelow described. First, a flow rate (actual flow rate) $Q(n)$ measured at a given time interval (e.g., two seconds, and the like) by the ultrasonic flowmeter 104 and a flow rate $Q(n-1)$ previously measured by the same are temporarily stored in the measured flow rate information storage section 106. Subsequently, the computation section 108 computes a difference value $\Delta Q(n)=Q(n)-Q(n-1)$ that is a difference between $Q(n)$ and the previously-measured flow rate $Q(n-1)$. The given interval may also be four seconds or six seconds.

By reference to the flow rate class table 110a shown in FIG. 2, the difference value conversion section 112 converts the difference value $\Delta Q(n)$ computed by the computation section 108 into a class code (4-bit code N1 or 2-bit code N2) that is a code representing a class into which difference values acquired at a given time interval are classified. Use of either the class code N1 or N2 is optional.

FIG. 3 shows example conversion using such a flow rate class table. When a gas flow rate arises as a result of startup of the gas appliance A (e.g., a fan heater) corresponding to any one of the gas appliances 13, 14, and 15 shown in FIG. 1, the flow rate to be measured changes from a flow rate Q(n)=0 to a flow rate Q(n)≠4 as represented by a "flow rate value" shown in FIG. 3($a$) and a graph of FIG. 3($b$), so that the flow rate changes according to the amount of gas used. Simultaneous with measurement of a flow rate by the ultrasonic flowmeter 104, the computation section 108 computes a difference value, and the difference value conversion section 112 converts the difference value into the class code N1 or the class code N2.

The code sequence generation section 114 generates, from a code acquired as a result of conversion, a measurement code sequence equivalent to a 2-bit code of the "class code N1" or a 4-bit code of the "class code N2" shown in FIG. 3($a$). A measurement code sequence, which is an aggregation of codes acquired at given periods and which is acquired through actual measurement, approximately represents a change in gas flow rate. The code sequence generation section 114 records an acquired measurement code sequence into unillustrated memory, as required.

Specifically, the "class code N1" and the "class code N2" shown in FIG. 3($a$) do not express a flow rate itself as represented by the "flow rate value" of FIG. 3($a$) or the graph of FIG. 3($b$). However, such a code sequence roughly, approximately represents a change in gas flow rate by four quadrants; namely, an area where a flow rate is determined to be zero, an area where a flow rate is determined to be stable, an area where a flow rate is determined to be increasing, and an area where a flow rate is determined to be decreasing. Thus, it is possible to ascertain an approximate change in flow rate behavior by use of a code sequence.

The foregoing measurement code sequence becomes smaller than the related-art history made up of difference values, in terms of the amount of information. However, since the memory size of the code sequence becomes smaller, it can be very easily handled. Therefore, various processing operations performed by an apparatus, such as a gas meter, become simple, and the quantity of required memory provided in the apparatus or at another location can be reduced. Further, the measurement code sequence of the present invention is smaller in memory size than the related-art history made up of difference values even when the measurement code sequence is data that are acquired over the same duration of measurement time as is the history; hence, data acquired over a longer period of measurement time can be easily handled.

When such a measurement code sequence is unique to each of the gas appliances, it becomes possible to identify a gas appliance that is using a gas.

Attention is paid to a flow rate change achieved over a predetermined period of time from initiation of use of a gas; for example, by the third sampling point (until elapse of six seconds). In the example of the gas appliance A shown in FIG. 3, the class code N1 (the measurement code sequence) comes to "0553." Meanwhile, the class code N1 (the measurement code sequence) of a gas flow rate acquired until the third sampling point comes to "0777," by the gas flow rate achieved in the same manner and acquired after startup of the gas appliance B (e.g., a hot water supply) shown in FIG. 4.

When the code N1 of the gas appliance A and the code N1 of the gas appliance B are compared with each, the gas appliance A rises according to a characteristic code sequence of "0553," and the gas appliance B rises according to a characteristic code sequence of "0777." Such a characteristic code sequence, which is an individual rise characteristic of each gas appliance, is previously stored. When the class code N1 that is a measurement code sequence acquired through measurement and conversion is "0553," the gas appliance used can be identified to be the gas appliance A. Further, when the class code N1 that is an acquired measurement code sequence is "0777," the gas appliance used can be identified to be the gas appliance B.

Figures 4A, 4B:
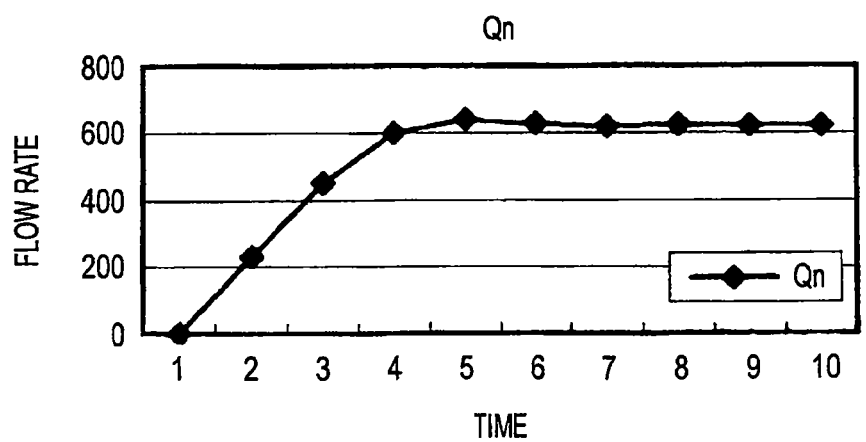
FIGS. 4 (A) and (B) are views showing a concept of classification of a difference value of flow rates resultant from use of a gas appliance B according to the flow rate class table.

According to the foregoing method, the appliance identification section 116 identifies a gas appliance that uses a gas, from the measurement code sequence generated by the code sequence generation section 114. The appliance identification section 116 compares a measurement code sequence with a characteristic code sequence of the gas appliance previously stored for each gas appliance in the appliance characteristic code sequence information retention section 118, and identifies a gas appliance currently using a gas from similarity between the code sequences. A code sequence unique to the gas appliance similar to N1 and N2 shown in FIGS. 3 and 4 is previously stored in the appliance characteristic code sequence information retention section 118. The code sequence unique to a gas appliance is generated in consideration of the codes N1 and N2 corresponding to respective difference flow rate zones of the flow rate class table 110$a$ shown in FIG. 2.

In the above example, the measurement code sequence and the appliance characteristic code sequence represent a rise characteristic of each of the gas appliance A, the gas appliance B, . . . ; namely, a flow rate rise characteristic acquired immediately after a gas appliance has started using a gas. However, no particular limitations are imposed on the code sequences, so long as the code sequences enable specification of a gas appliance. All code sequences representing a control characteristic (a flow rate control characteristic) achieved during operation of a gas appliance are used as the measurement code sequence and the appliance characteristic code sequence. Flow rate characteristics achieved during operation of an appliance include; for instance, a flow rate rise characteristic achieved immediately after an appliance has started using a fluid, a flow rate fall characteristic achieved after use of a fluid, a flow rate control characteristic achieved when a fluid is stably used, and the like. The code sequences unique to gas appliances stored in the appliance characteristic code sequence information retention section 1 18 are not previously set but may also be learned and corrected by actual measurement of a flow rate.

Moreover, when attention is paid to the code N2 achieved from a flow rate rise (a startup) by a predetermined time (e.g., the seventh code), the code N2 of the gas appliance A is "01131133," and the code N2 of the gas appliance B is "01111333." The code N2 is defined by 0: an area where a flow rate is zero; 1: an increase area, 2: a decrease area, and 3: a stable area. It is understood from the code N2 of the gas appliance A that the gas appliance A is characterized by a temporary rise, an increase, temporary stability, and a second increase. In the meantime, it is understood from the code N2 of the gas appliance B that the gas appliance B is characterized by a temporary rise, a continual increase, and subsequent stability. Accordingly, when the code N2 is "01131133," the possibility of a currently-operating gas appliance being the gas appliance A can be identified. Further, when the code N2 is "01111333," the possibility of a currently-operating gas appliance being the gas appliance B can be identified. The characteristic of the gas appliance A and the characteristic of the gas appliance B can be readily identified by combination of the code N1 with the code N2.

Figures 5A, 5B:
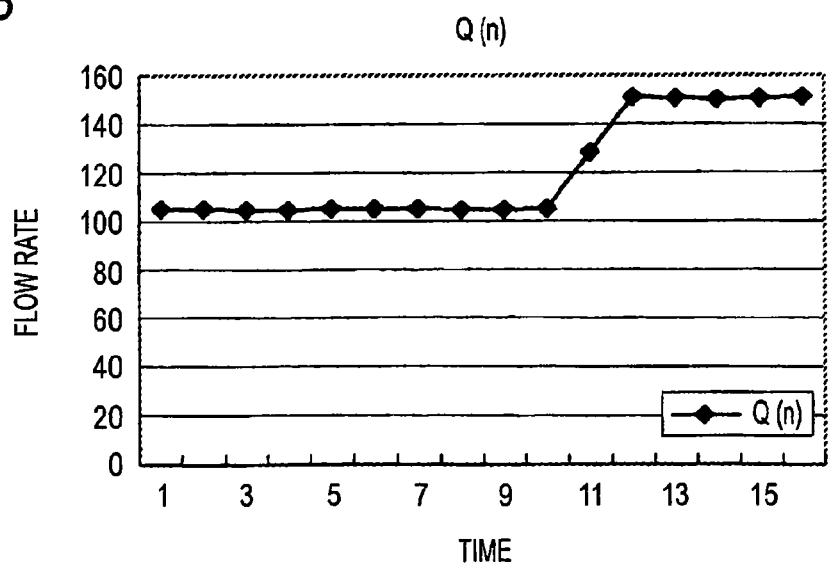
FIGS. 5 (A) and (B) are views showing a concept of classification of a difference value of flow rates resultant from use of a gas appliance C according to the flow rate class table.
FIGS. 5(C) and (D) are views showing a concept of classification of a difference value of flow rates resultant from use of a gas appliance D according to the flow rate class table.
Figures 5C, 5D:
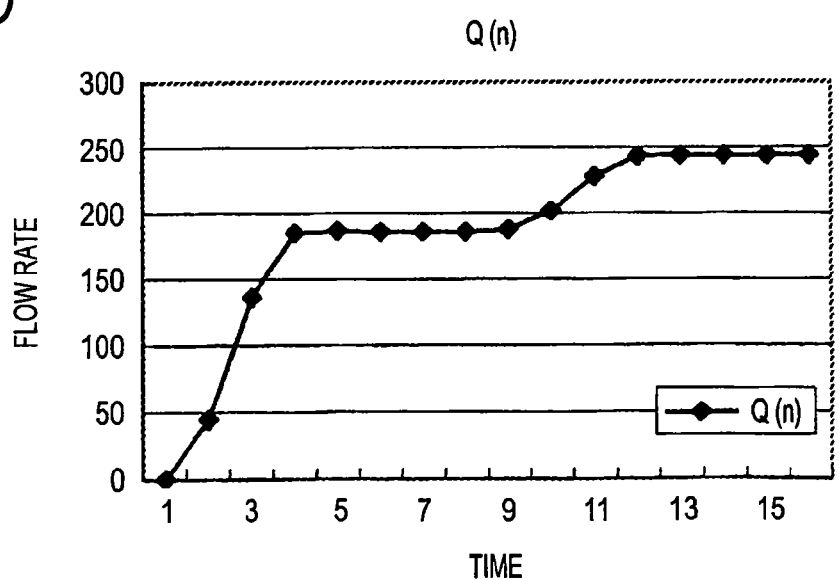

In FIGS. 3 and 4, flow rate rise characteristics of two gas appliances achieved immediately after initiation of use of a gas are compared with each other, thereby identifying a gas appliance. FIG. 5 shows an example in which a gas appliance is identified by comparing flow rate change characteristics achieved during operation of the gas appliances with each other. FIGS. 5(a) and (b) show a table and a graph pertaining to flow rate changes including timing at which the amount of flow used by the gas appliance C is increased during the course of operation of the gas appliance. FIGS. 5(c) and (d) show a table and a graph pertaining to flow rate changes in the gas appliance D appeared during operation after the gas appliance has started using a gas.

When the amount of gas used by the gas appliance C is increased, an increase arises at the eleventh measured flow rate, and the flow rate again becomes stable at the thirteenth measured flow rate and subsequent measured flow rate in the example operations shown in FIGS. 5(a) and (b). An increasing characteristic achieved during operation is expressed by "3333333333113 . . . " in the code sequence of the code N2, and an increasing characteristic is expressed by "999111199991449 . . ." in the code sequence of the code N1. In each code sequence, an increasing area corresponds to "11" portion of the code N2 and "44" portion of the code N1. Therefore, when the code N2 of the flow rate increasing characteristic achieved in the middle of operation is "11" or the code N1 of the flow rate increasing characteristic achieved in the middle of operation is "44," the working gas appliance can be identified to be the gas appliance C.

In the example operations of the gas appliance D shown in FIGS. 5(c) and (d), an increase arises at the tenth measured flow rate, and the flow rate again becomes stable at the thirteenth measured flow rate and subsequent measured flow rate. An increasing characteristic achieved during operation is expressed by "0111333331113 . . . " in the code sequence of the code N2, and an increasing characteristic is expressed by "05653AA234542 . . . " in the code sequence of the code N1. In each code sequence, an increasing area corresponds to a latter "111" portion of the code N2 and "454" portion of the code N1. Therefore, when the code N2 of the flow rate increasing characteristic achieved in the middle of operation is "111" or the code N1 of the flow rate increasing characteristic achieved in the middle of operation is "454," the working gas appliance can be identified to be the gas appliance D.

The flow rate increasing characteristic of the gas appliance C is represented by a two-digit consecutive code, whilst the flow rate increasing characteristic of the gas appliance D is represented by a three-digit consecutive code. These mean that the gas appliance C exhibits a sharp increasing characteristic and that the gas appliance D exhibits a gentle increasing characteristic. A code sequence of such an increasing characteristic is previously stored as an appliance characteristic code sequence for each gas appliance in the appliance characteristic code sequence information retention section 118. The gas appliance C and the gas appliance D can readily be distinguished from each other by comparing the thus-stored appliance characteristic code sequence with a code sequence achieved at the time of measurement of an increase. So long as a comparison between actual difference values and a comparison between actual flow rate values are also employed in conjunction with the measurement code sequence, highly-accurate appliance identification becomes possible.

Figures 6A, 6B:
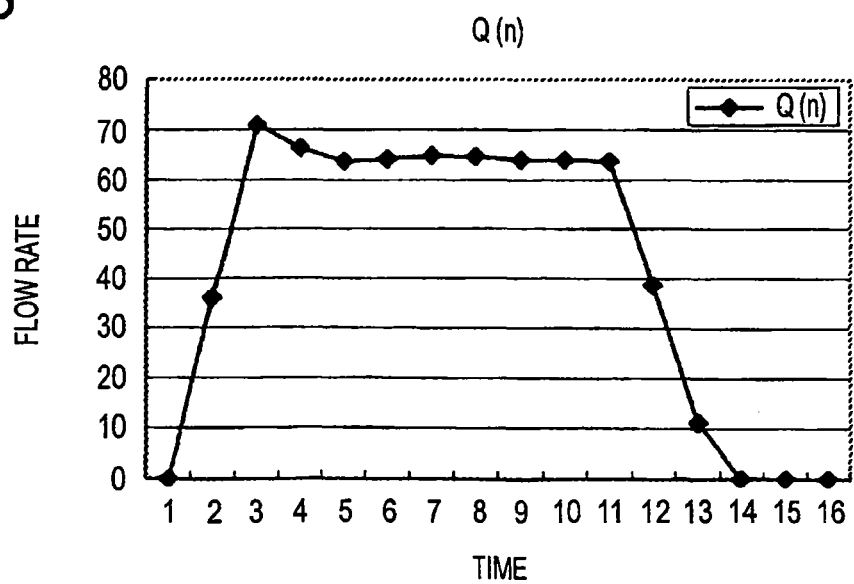
FIGS. 6 (A) and (B) are views showing a concept of classification of a difference value of flow rates resultant from use of a gas appliance E according to the flow rate class table.
FIGS. 6(C) and (D) are views showing a concept of classification of a difference value of flow rates resultant from use of a gas appliance F according to the flow rate class table.
Figures 6C, 6D:
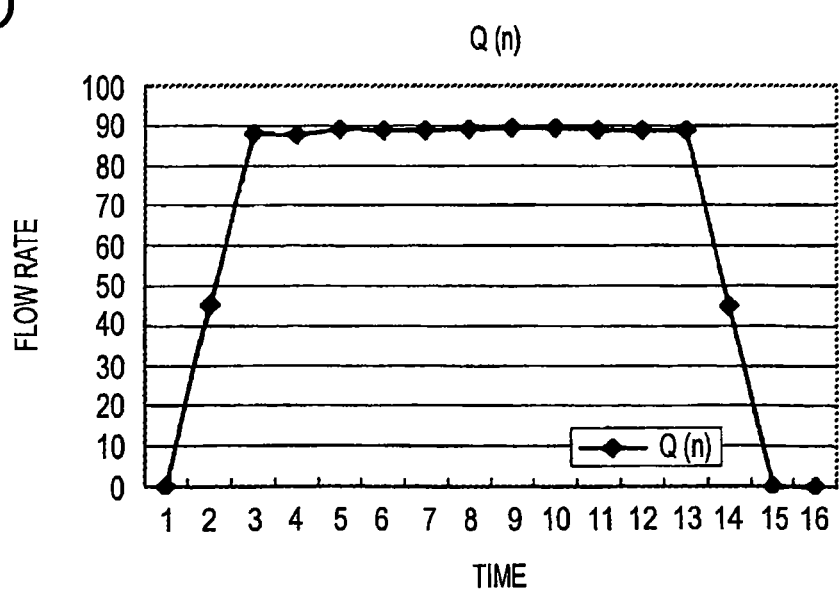

FIG. 6 shows an example identification of a gas appliance by a comparison between flow rate fall characteristics achieved at the time of deactivation of the gas appliance (at the time of completion of use of a gas). FIGS. 6(a) and (b) show a table and a graph pertaining to changes in flow rate used from when the gas appliance E is started until when the gas appliance is stopped. FIGS. 6(c) and (d) show a table and a graph showing changes in the flow rate used from when the gas appliance F is started and until when the gas appliance F is stopped.

When the flow rate difference values achieved immediately before the flow rate comes to zero in FIGS. 6(a) and (b) are converted into codes, the code N1 is expressed by " . . . 9DDC0" and the code N2 is expressed by " . . . 32220." When attention is paid to "2220" of the code N2, the corresponding code N1 is "DDC0," and the fall characteristic of the gas appliance E is understood to be represented by a three-digit consecutive code. As is understood from the N2 code sequence "DDC0," the flow rate achieved at the time of deactivation of the gas appliance E drastically decreases twice and gently decreases to stop in the end.

When the flow rate difference value achieved immediately before the flow rate comes to zero in FIGS. 6(c) and (d) is converted into codes, the code N1 is expressed by " . . . 9DD0" and the code N2 is expressed by " . . . 3220." When attention is paid to " . . . 220" of the code N2, the corresponding code N1 is "DD0," and the fall characteristic of the gas appliance F is understood to be represented by a two-digit consecutive code. As is understood from the N2 code sequence "DD0," the flow rate achieved at the time of deactivation of the gas appliance F drastically decreases twice, to thus come to a stop.

Such a fall characteristic is previously stored as an appliance characteristic code sequence for each gas appliance in the appliance characteristic code sequence information retention section 118. The gas appliance E and the gas appliance F can readily be distinguished from each other by comparing the thus-stored appliance characteristic code sequence with a code sequence achieved at the time of measurement of a fall. So long as a comparison between actual difference values and a comparison between actual flow rate values are also employed in conjunction with the measurement code sequence, highly-accurate appliance identification becomes possible.

The measurement code sequence and the appliance characteristic code sequence may also be imparted with a duration between initiation of use of a gas by a gas appliance and appearance of a specific code sequence pattern.

Figure 7A:
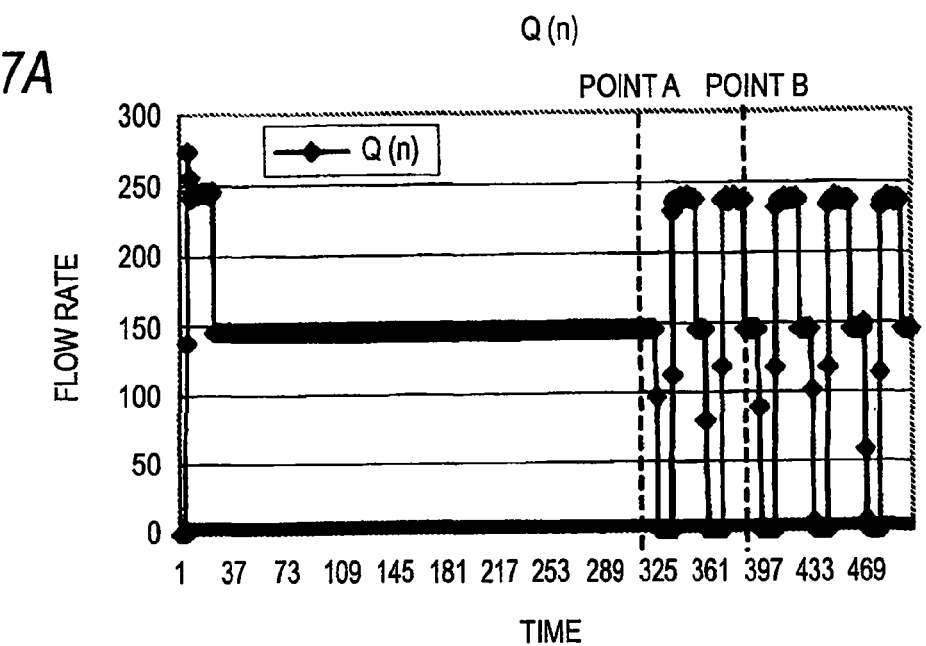
FIGS. 7 (A) and (B) are graphs showing a measured flow rate of a gas appliance G.
FIG. 7(C) is a view showing the measured flow rate value, a difference value, and a code sequence classified according to the flow rate class table.

For instance, some of gas appliances repeat combustion and extinction operations in order to control a room temperature or the temperature of hot water. The appliances can be identified by ascertaining characteristics of the appliances through measurement of a combustion period, an extinction period, a combustion/extinction periodic time, and the like. In such a case, an appliance can be identified as a specific code sequence pattern by not only simply measuring a flow rate equivalent to one period from initiation of use of a gas appliance (a rise characteristic) until stoppage of the gas appliance (a fall characteristic) but also iteratively measuring a flow rate from the initiation of start of a gas appliance until the stoppage of use of the gas appliance a plurality of times. For instance, it is understood that FIG. 7(a) shows a flow rate characteristic of the gas appliance G and that combustion and extinction are iterated in a latter half of operation.

Figure 7B:
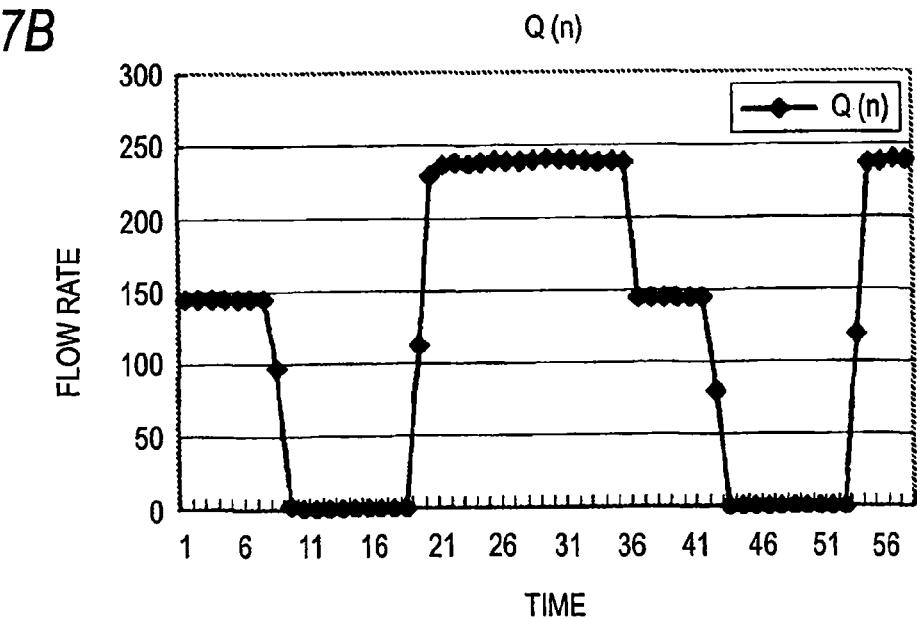

FIG. 7(b) shows, in an enlarged manner, changes appearing between point A and point B. As shown in FIG. 7(c), the code N1 is expressed by " . . . 8888888CDB00000000 6633B33A92399AA99D88888DD0000000006623A . . . ," and the code N2 is expressed by " . . . 3333333 2230000000011333333333333323333322000000000011 333 . . . ." The code N2 achieved from stoppage of the gas appliance until next start of the appliance is expressed by "... 0001133," and the pattern is again measured in a latter half. In this case, the thus-repeated rise characteristic "... 0001133..." and a time elapsing during the period of the rise (33 data sets×a measurement periodic time (e.g., two seconds)=66 sec.) can be detected as a characteristic of the appliance. Accordingly, a code sequence is continually calculated until use of a flow rate is completely stopped. When a code sequence of a similar pattern is measured next time in connection with the rise characteristic and the periodic time, the appliance can be identified as the gas appliance G.

As mentioned above, the measurement code sequence of the present invention is smaller in memory size than the related-art history made up of difference values even when the measurement code sequence is data that are acquired over the same duration of measurement time as is the history; hence, data acquired over a longer period of measurement time becomes easy to handle. Therefore, even at the time of identification an appliance, a flow rate change history corresponding to a long period of measurement time becomes easy to handle. The accuracy of identification of an appliance can be enhanced by use of a long-duration flow rate change history.

FIG. 8 shows another example of the flow rate class table 110a. The flow rate class table shown in FIG. 5 differs from its counterpart shown in FIG. 2 in terms of actual values to be classified. In the example shown in FIG. 2, 16 classes (the code N1) and the four classes (the code N2) are prepared within the range from 0 to a difference value of 150 L/h. In contrast, in an example shown in FIG. 8, 16 classes (the code N1) and the four classes (the code N2) are likewise prepared within a range from 0 to a difference value of 30 L/h. Therefore, when a gas appliance involving consumption of a small flow rate (a gas appliance involving a small actual flow rate and a narrow range of change) is in operation, the table shown in FIG. 8 is used for identification in a more preferred manner than is the table shown in FIG. 2. For instance, when a gas appliance involving a flow rate Q(n)≥200 L/h is used, the table shown in FIG. 2 is used. When a gas appliance involving a flow rate Q(n)<200 L/h is used, a gas appliance can be accurately determined by use of the table shown in FIG. 8.

The class table may also be switchably used according to the flow rate rise characteristic, the flow rate control characteristic, and the flow rate fall characteristic (the stop characteristic).

Second Embodiment

Figure 9:
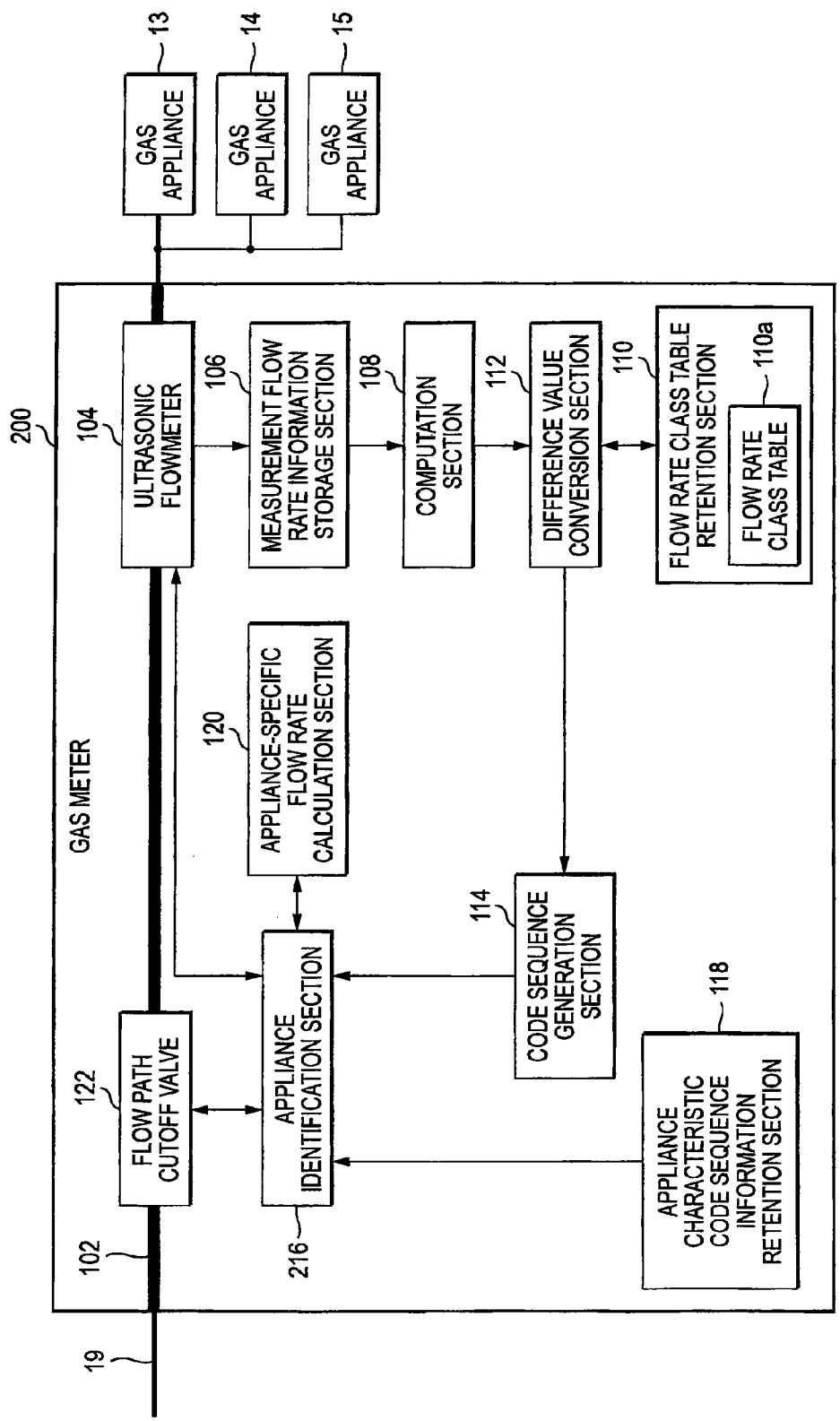
FIG. 9 is a block diagram of a gas meter of a second embodiment of the present invention.

FIG. 9 shows a block diagram of a gas meter serving as a fluid measurement apparatus of a second embodiment of the present invention. In a gas meter 200 of the second embodiment, operation of an appliance identification section 216 partially differs from operation of its counterpart of the first embodiment, and in other respects the gas meters are structurally, operationally analogous to each other. Only characteristic operation of the second embodiment is now described, and explanations about the structure and operation analogous to those described in connection with the first embodiment are omitted.

The appliance identification section 216 of the second embodiment identifies an appliance from a measurement code sequence and characteristic values, in consideration of a combination of the flow rate measurement code sequence with the characteristic values, such as an actual difference value and an actual flow rate value.

Below is provided an embodiment in which an appliance is identified by combination of the measurement code sequence with characteristic values, such as an absolute magnitude of a difference value and an absolute flow rate value. The case of the gas appliance A shown in FIG. 3 is now exemplified. Attention is paid to the code N2 achieved after lapse of a predetermined period (e.g., the seventh timing) from the rise (start) of a flow rate, and the code N2 of the gas appliance A assumes "01131133." It is seen from the code N2 that a flow rate characteristic of the gas appliance A is characterized by initiation of a flow rate, temporary stability, a subsequent increase in flow rate, and second stability. In the code N1 and the code N2, a value showing a segment (a stable area "3") where a flow rate remains stable makes it possible to determine a predetermined point of time where stability is achieved; namely, a stabile point. Consequently, a flow rate value (a stable value) achieved at the first stable point and a flow rate value achieved at a second stable point where flow rate again becomes stable are measured, and the thus-measured flow rate values can be taken as characteristic values for the gas appliance A.

A flow rate value achieved at the first stable point that belongs to the stable area "3" is 123 L/h, and a flow rate value achieved at the second stable point is 165 L/h. For instance, the gas appliance can be identified as the gas appliance A from flow rate characteristics in which the code N1 achieved at the third sampling point from initiation of use of a gas appliance (after elapse of six seconds) is "0553" and in which the flow rate value achieved at the first stable point is 123 L/h. As mentioned above, an appliance can be identified more accurately by combination of the measurement code sequence with a characteristic value (an absolute flow rate value employed here). In relation to actual identifying operation, if identification is performed by setting a predetermined effective range (e.g., ±10 L/h) for the flow rate value 123 L/h that is a characteristic value, variations can be absorbed. If a flow rate value achieved at the second stable point is 165 L/h in addition to the flow rate value achieved at the first stable point, the gas appliance can be identified as the gas appliance A with a higher degree of certainty.

When a room temperature is close to a preset temperature, the gas flow rate in the fan heater is also decreased in order to reduce the amount of combustion. Therefore, it is a possibility that the flow rate value (in a neighborhood of 123 L/h) achieved at the first stable point will be once acquired at a point in time when combustion is started and that a reduced flow rate value (e.g., 100 L/h) will be acquired at the second stable point. Therefore, the flow rate value achieved at the second stable point is previously registered, as a characteristic value for the gas appliance A, so as to fall within a range from the minimum amount (e.g., 90 L/h) to the maximum amount (e.g., 170 L/h). If there is a second stable point and if a flow rate value achieved at that stable point falls within the predetermined range from the minimum amount to the maximum amount, a gas appliance can be identified as the gas appliance A.

As mentioned above, a point in time when the stable area "3" arises; namely, a stable point, is found in the code N1 of the measurement code sequence. A flow rate value achieved at the stable point is measured, and a determination is made by combination of the thus-measured flow rate value with the code sequence of the code N2, whereby an appliance can be identified with a higher degree of certainty. In addition to an absolute flow rate value achieved when a flow rate is stable, such as that mentioned above, a flow rate absolute value achieved at a flow rate peak, and the like, may also be used as a characteristic value. In connection with an absolute flow rate value, for instance, a maximum flow rate achieved during a period from initiation of use of a gas appliance until elapse of a predetermined period of time, and the like, is used as a characteristic value, thereby enabling determination of a characteristic of an appliance. There can also be used, as characteristic values, values showing characteristics of a flow rate, such as, the gradient of a flow rate and a unique behavior achieved at a start (a rise) and a stop (a fall) other than a stable period, a peak period, and the like, or a flow rate value and a gradient of a flow rate achieved in a specific state in response to operation control of a gas appliance. Further, an appliance can also be identified by combination of at least two of these characteristic values, as required.

Third Embodiment

Figure 10:
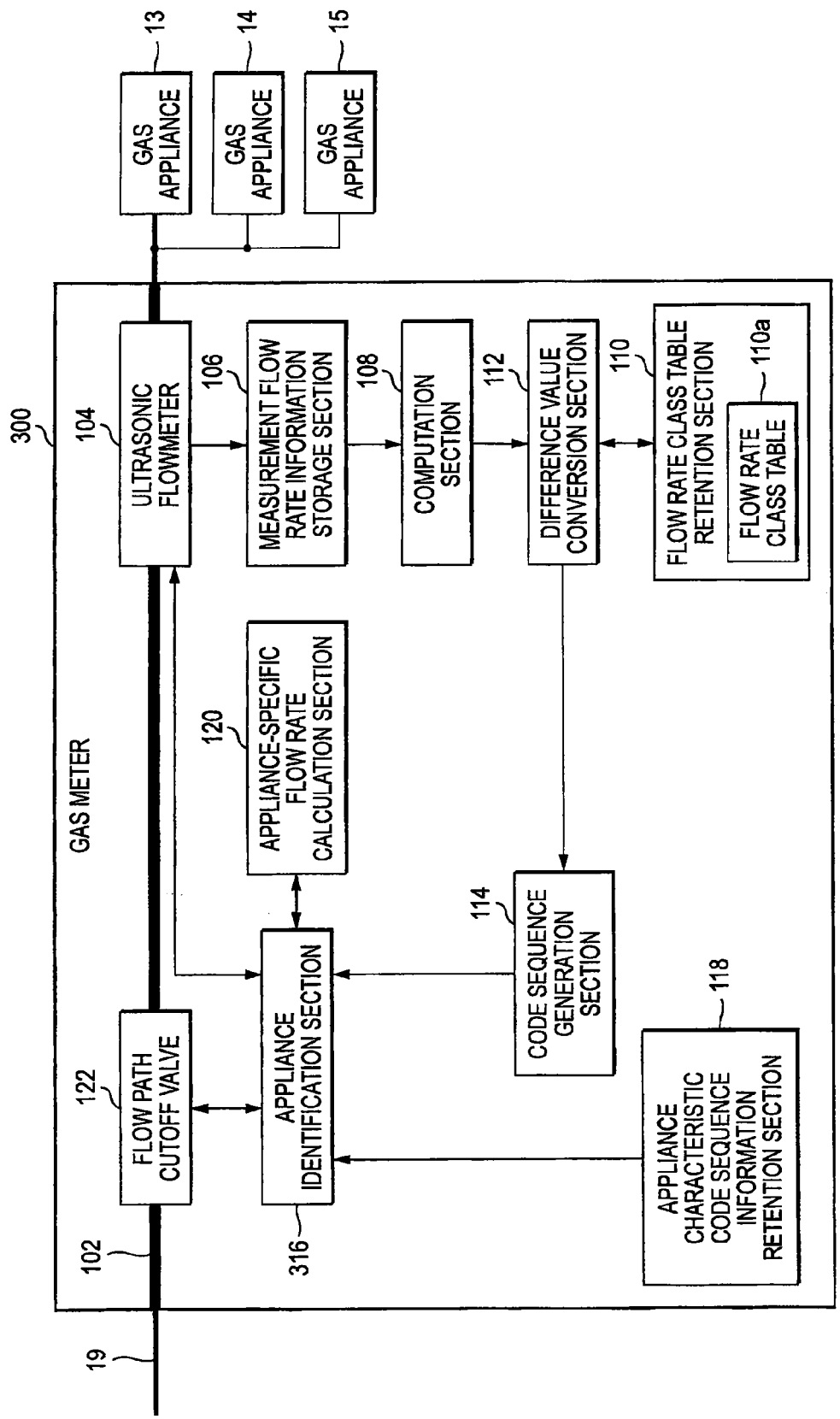
FIG. 10 is a block diagram of a gas meter of a third embodiment of the present invention.
Figure 11:
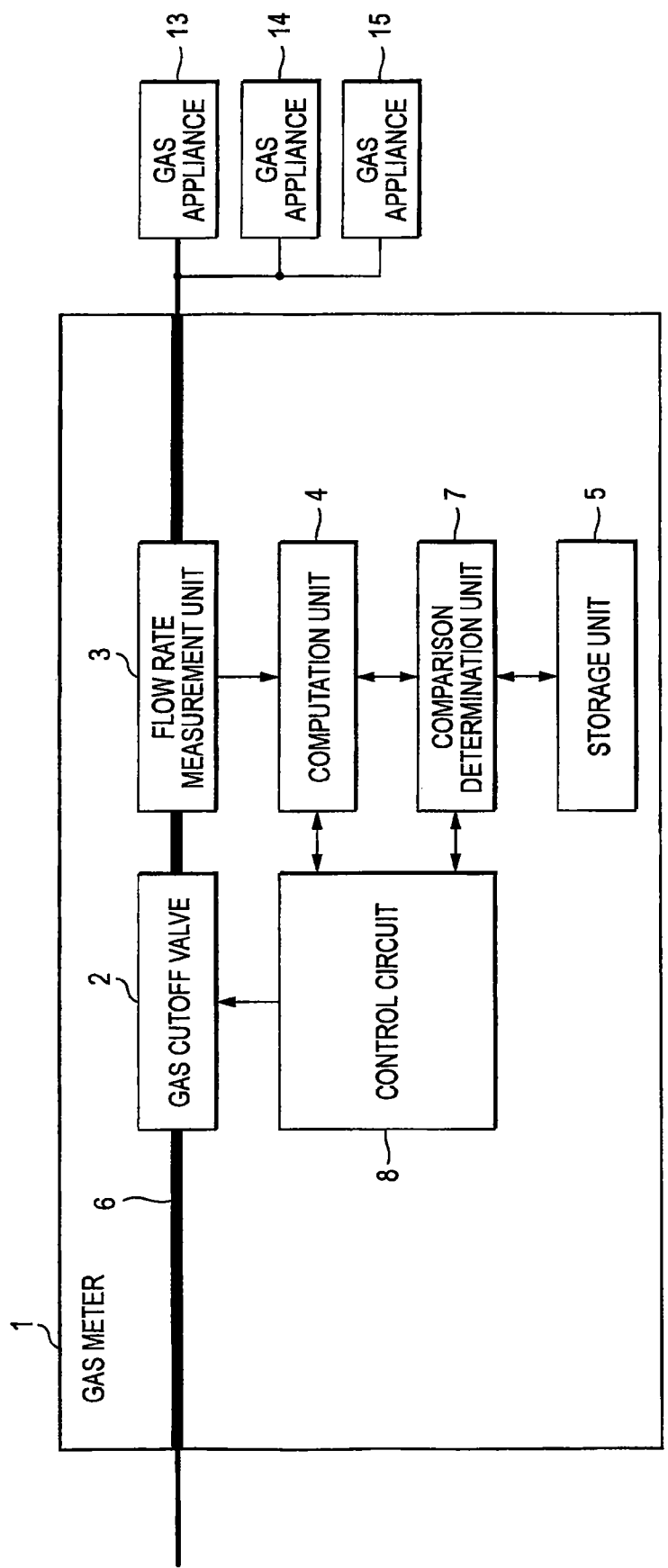
FIG. 11 is a block diagram of a related-art gas meter.

FIG. 10 shows a block diagram of a gas meter of a flow rate measurement apparatus of a third embodiment of the present invention. In a gas meter 300 of the third embodiment, operation of an appliance identification section 316 partially differs from operation of its counterpart of the first embodiment, and in other respects the gas meters are structurally, operationally analogous to each other. Only characteristic operation of the third embodiment is now described, and explanations about the structure and operation analogous to those described in connection with the first embodiment are omitted.

The appliance identification section 316 of the third embodiment identifies an appliance based on a pattern that iteratively arises in the flow rate measurement code sequence.

An example in which an appliance is identified by an iterative pattern of the measurement code sequence is provided below. A case of the gas appliance G shown in FIG. 7 is now exemplified. In the embodiment shown in FIG. 7(c), an iterative rise characteristic " . . . 0001133 . . . " and a time elapsed during the period of the iterative rise characteristic (33 data sets×a measurement periodic time (e.g., two seconds)=66 seconds) can be detected as a characteristic of an appliance. When a code sequence of a similar pattern is measured next time in connection with the rise characteristic and the periodic time, the appliance can be identified as the gas appliance G.

As mentioned above, an appliance can be identified with a higher degree of certainty by use of a pattern iteratively arising in the measurement code sequence including a flow rate rise characteristic, a flow rate fall characteristic, and a characteristic achieved when a flow rate is stable. The essential requirement for an iteratively-arising pattern is a pattern that iteratively appears in the number of at least two. No limitations are imposed on the number of iteration, iteration timing, and periodicity, so long as identification is possible. However, if the pattern periodically, iteratively arises, the accuracy of identification will be enhanced to a much greater extent. An appliance can be identified more reliably by use of a pattern iteratively arising in a measurement code sequence and an interval of appearance of the pattern (a time between patterns). When the pattern has periodicity, the accuracy of identification is further enhanced by use of a periodically, iteratively arising pattern and the period of the pattern. Various times pertaining to periodicity; namely, a duration from the initiation of use of a fluid by an appliance (an ON time) to initiation of next use of the fluid (an ON time); a duration from the end of use of the fluid (an OFF time) to the end of the next use of the fluid (an OFF time); a duration from the initiation of use of a fluid (an ON time) to the end of the next use of the fluid (an OFF time); a duration from the end of use of the fluid (an OFF time) to initiation of the next use of the fluid (an ON time), and the like, can be used as the periodicity of the pattern.

In order to implement the fluid measurement method, such as that mentioned above, a program for performing processing pertaining to respective steps of the fluid measurement method is stored in the appliance identification section 116 and an unillustrated computer (an arithmetic unit) of the gas meter 100. A fluid supply system including the fluid measurement apparatus, the fluid measurement method, and a fluid (gas) supply source using a program to be executed by a computer, all of which pertain to the present invention, is encompassed by the present invention.

Although the above descriptions are provided for the case where the ultrasonic flowmeter is used, it is obvious that another instantaneous flow rate measurement apparatus using a sampling signal also yields a similar effect. Although explanations about processing subsequent to identification of an appliance are omitted, it is obvious that a gas meter can also set an appliance-specific charge determined by measurement of an integrated flow rate for each registered appliance or each classified group and appliance-specific safety function of safety management (safety function) for each of groups classified according to a registered appliance. If each of a gas meter and a gas appliance can be equipped with a transceiving unit, such as a radio set, further enhancement of accuracy of appliance identification is obvious. Moreover, although described in connection with the gas meter and the gas appliance, the fluid measurement apparatus can also be used likewise in an industrial flowmeter and a water meter for specifying working appliances connected to downstream positions with respect to the fluid measurement apparatus and grouping the working appliances.

In relation to the code N1 of each of the classes (FIG. 2 and FIG. 8) of the fluid class table, difference flow rates of respective subdivided regions differ from each other in terms of a width. However, the difference flow rates may also be subdivided substantially equally in at least the increase area and the decrease area.

A difference flow rate value of gas, which is a fluid of the embodiments, is taken as an object of coding. However, the object of coding of the present invention is not limited to a flow rate. The temperature, the pressure, the mass, and the like, of a fluid can be ascertained broadly as physical quantity of a fluid.

Although the embodiments of the present invention have been described thus far, the present invention is not limited to matters provided in the embodiments. The present invention is also scheduled to be subjected to alterations and application which will be made by persons skilled in the art on the basis of the descriptions of the present patent application and known techniques, and the alterations and application shall also fall within a range for which protection of the present invention is sought.

Although the present invention has been described in detail by reference to the specific embodiments, it is manifest for those skilled in the art that the invention is susceptible to various alterations and modifications without departing the spirit and scope of the present invention.

The present patent application is based on Japanese Patent Application (JP-A-2007-154763) filed on Jun. 12, 2007; Japanese Patent Application (JP-A-2007-172545) filed on Jun. 29, 2007; and Japanese Patent Application (JP-A-2007-172546) filed on Jun. 29, 2007, contents of which are incorporated herein by reference.

INDUSTRIAL APPLICABILITY

As mentioned above, according to the present invention, a difference value is converted into a code easier to handle.

Therefore, on occasion of provision of a technique for identifying an appliance using fluid, an attempt can be made to enhance computing speed and the accuracy of identification of an appliance while the amount of memory required for an apparatus is reduced.

What is claimed is:

1. A flow rate measurement apparatus comprising:
a flow rate measurement section comprising an ultrasonic flowmeter, the ultrasonic flowmeter measures a flow rate of a fluid flowing through a flow path at a given time interval;
a computation section that computes a series of difference values corresponding to consecutive flow rates measured by the flow rate measurement section at the given time intervals over a predetermined time period, each of the difference values indicating an absolute magnitude of a difference between a flow rate measured at a first time interval and a flow rate measured at a second time interval next to the first time interval, wherein the given time interval occurs multiple times during the predetermined time period;
a flow rate class table stored in a memory, the flow rate class table comprising a plurality of codes, each code corresponding to a different range of difference values of the flow rate such that an identical code is assigned to an identical difference value of the flow rate, regardless of a type of appliance and a flow rate pattern;
a difference value conversion section that converts, for each of the given time intervals occurring during the predetermined time period, each of the difference values computed by the computation section into the corresponding code based on the flow rate class table;
a code sequence generation section that generates a measurement code sequence corresponding to the predetermined time period by consecutively aggregating the codes corresponding to the given time intervals occurring within the predetermined time period; and
an appliance identification section that identifies an appliance which uses the fluid based on the measurement code sequence.

2. The flow rate measurement apparatus according to claim 1, wherein
the appliance identification section identifies an appliance, which uses the fluid, based on the measurement code sequence and a characteristic value pertaining to the measured flow rate.

3. The flow rate measurement apparatus according to claim 2, wherein the characteristic value shows an absolute flow rate achieved when the measured flow rate is stable.

4. The flow rate measurement apparatus according to claim 2, wherein the characteristic value shows an absolute flow rate achieved when the measured flow rate is at its peak.

5. The flow rate measurement apparatus according to claim 2, wherein the characteristic value is a control characteristic value showing a flow rate characteristic achieved in a specific state in response to operation control of an appliance.

6. The flow rate measurement apparatus according to claim 2, wherein the characteristic value is a combination of at least two of an absolute flow rate achieved when the measured flow rate is stable, an absolute flow rate achieved when the measured flow rate is at its peak, and a control characteristic value showing a flow rate characteristic achieved in a specific state in response to operation control of an appliance.

7. The flow rate measurement apparatus according to claim 1, wherein
the appliance identification section identifies an appliance, which uses the fluid, based on a pattern iteratively arising in the measurement code sequence.

8. The flow rate measurement apparatus according to claim 7, wherein a pattern in the measurement code sequence is a pattern that periodically, iteratively appears.

9. The flow rate measurement apparatus according to claim 7, wherein the appliance identification section identifies an appliance based on a pattern iteratively appearing in the measurement code sequence and an interval at which the pattern appears.

10. The flow rate measurement apparatus according to claim 7, wherein the appliance identification section identifies an appliance based on a pattern periodically, iteratively appearing in the measurement code sequence and a period of the pattern.

11. The flow rate measurement apparatus according to claim 10, wherein the period of the pattern corresponds to a duration from initiation of use of a fluid to initiation of next use of the fluid when the appliance iterates initiation of use of the fluid and end of use of the fluid.

12. The flow rate measurement apparatus according to claim 10, wherein the period of the pattern corresponds to a duration from end of use of a fluid to end of next use of the fluid when the appliance iterates initiation of use of the fluid and end of use of the fluid.

13. The flow rate measurement apparatus according to claim 10, wherein the period of the pattern corresponds to a duration from initiation of use of a fluid to end of next use of the fluid when the appliance iterates initiation of use of the fluid and end of use of the fluid.

14. The flow rate measurement apparatus according to claim 10, wherein the period of the pattern corresponds to a duration from end of use of a fluid to initiation of next use of the fluid when the appliance iterates initiation of use of the fluid and end of use of the fluid.

15. The flow rate measurement apparatus according to claim 1, wherein the measurement code sequence shows a flow rate control characteristic of an appliance achieved during operation of the appliance.

16. The flow rate measurement apparatus according to claim 1, wherein the measurement code sequence shows a flow rate rise characteristic of an appliance including a time of initiation of use of a fluid by the appliance.

17. The flow rate measurement apparatus according to claim 1, wherein the measurement code sequence shows a flow rate fall characteristic of an appliance including a time of end of use of a fluid by the appliance.

18. The flow rate measurement apparatus according to claim 1, wherein the measurement code sequence has a duration from when an appliance starts using a fluid until when a specific code sequence pattern appears.

19. A fluid supply system using the flow rate measurement apparatus of claim 1.

20. The flow rate measurement apparatus according to claim 1, wherein the appliance identification section compares the measurement code sequence with an appliance characteristic code sequence showing a characteristic code sequence of each appliance, thereby identifying an appliance which uses the fluid.

21. The flow rate measurement apparatus according to claim 20, wherein the measurement code sequence and the appliance characteristic code sequence show a flow rate control characteristic of an appliance achieved during operation of the appliance.

22. The flow rate measurement apparatus according to claim 20, wherein the measurement code sequence and the appliance characteristic code sequence show a flow rate rise characteristic including a time of initiation of use of a fluid by an appliance.

23. The flow rate measurement apparatus according to claim 20, wherein the measurement code sequence and the appliance characteristic code sequence show a flow rate fall characteristic including a time of end of use of a fluid by an appliance.

24. The flow rate measurement apparatus according to claim 20, wherein the measurement code sequence and the appliance characteristic code sequence have a duration from when an appliance starts using a fluid until when a specific code sequence pattern appears.

25. The flow rate measurement apparatus according to claim 1, wherein the appliance identification section identifies an appliance which uses the fluid, based on at least two measurement code sequences.

26. The flow rate measurement apparatus according to claim 1, wherein the flow rate class table comprises at least three codes respectively corresponding to classes of a stable area where a flow rate is determined to be stable, an increase area where a flow rate is determined to be increasing, and a decrease area where a flow rate is determined to be decreasing.

27. The flow rate measurement apparatus according to claim 1, wherein the flow rate class table comprises a zero-indicated code corresponding to a class of an area where a flow rate is determined to be zero, and
the difference value conversion section coverts the difference value into the zero-indicated code when it is determined that the flow rate of the fluid flowing through the flow path indicates zero.

28. A flow rate measurement method comprising:
measuring a flow rate of a fluid flowing through a flow path at a given time interval, the flow path including an ultrasonic flowmeter;
computing, using a computer processor, a series of the difference values corresponding to consecutive flow rates measured at the given time intervals over a predetermined time period, each of the difference values indicating absolute magnitude of a difference between a flow rate measured at a first time interval and a flow rate measured at a second time interval next to the first time interval, wherein the given time interval occurs multiple times during the predetermined time period;
converting, using the computer processor, each of the difference values into a code based on a flow rate class table, wherein each code corresponds to one of the given time intervals occurring during the predetermined time period, and wherein the flow rate class table comprising a plurality of codes, each code corresponding to a different range of difference values of the flow rate such that an identical code is assigned to an identical difference value of the flow rate, regardless of a type of appliance and a flow rate pattern;
generating, using the computer processor, a measurement code sequence corresponding to the predetermined time period by consecutively aggregating the codes corresponding to the given time intervals occurring within the predetermined time period; and
identifying, using the computer processor, appliance which uses the fluid, based on the measurement code sequence.

29. The flow rate measurement method according to claim 28, wherein
the appliance which uses the fluid is identified, based on the measurement code sequence and a characteristic value pertaining to the measured flow rate.

30. The flow rate measurement method according to claim 28, wherein
the appliance which uses the fluid is identified, based on a pattern iteratively arising in the measurement code sequence.

31. The flow rate measurement method according to claim 28, wherein the appliance which uses the fluid is identified by comparing the measurement code sequence with an appliance characteristic code sequence showing a characteristic code sequence of each appliance.

32. The flow rate measurement method according to claim 28, wherein the appliance which uses the fluid is identified, based on at least two measurement code sequences.

33. A non-transitory computer readable medium containing a program for causing a computer which controls a flow rate measurement apparatus to execute processing pertaining to
measuring a flow rate of a fluid flowing through a flow path at a given time interval the flow path including an ultrasonic flowmeter;
computing a series of difference values corresponding to consecutive flow rates measured at the given time intervals over a predetermined time period, each of the difference values indicating absolute magnitude of a difference between a flow rate measured at a first time interval and a flow rate measured at a second time interval next to the first time interval, wherein the given time interval occurs multiple times during the predetermined time period;
converting each of the difference values into a code based on a flow rate class table, wherein each code corresponds to one of the given time intervals occurring during the predetermined time period, and wherein the flow rate class table comprising a plurality of codes, each code corresponding to a different range of difference values of the flow rate such that an identical code is assigned to an identical difference value of the flow rate, regardless of a type of appliance and a flow rate pattern;
generating a measurement code sequence corresponding to the predetermined time period by consecutively aggregating the codes corresponding to the given time intervals occurring within the predetermined time period; and
identifying appliance which uses the fluid, based on the measurement code sequence.

34. The non-transitory computer readable medium according to claim 33, wherein
the appliance which uses the fluid is identified, based on the measurement code sequence and a characteristic value pertaining to the measured flow rate.

35. The non-transitory computer readable medium according to claim 33, wherein
the appliance which uses the fluid is identified, based on a pattern iteratively arising in the measurement code sequence.

36. The non-transitory computer readable medium according to claim 33, wherein the appliance which uses the fluid is identified by comparing the measurement code sequence with an appliance characteristic code sequence showing a characteristic code sequence of each appliance.

37. The non-transitory computer readable medium according to claim 33, wherein the appliance which uses the fluid is identified, based on at least two measurement code sequences.

* * * * *